United States Patent [19]

Marfy

[11] 3,813,689

[45] May 28, 1974

[54] TAPE MACHINE WITH INDEX MEMBERS TO CONTROL TAPE TRANSPORT

[75] Inventor: Zoltan Josef Marfy, Hounslow, England

[73] Assignee: Clark and Smith Industries Limited, Wallington, Surrey, England

[22] Filed: Oct. 4, 1972

[21] Appl. No.: 294,827

[30] Foreign Application Priority Data

Oct. 4, 1971 Great Britain .................... 46142/71

[52] U.S. Cl. .................... 360/74, 235/103, 274/4 C, 274/4 E, 318/467

[51] Int. Cl. ...................... G11b 15/22, G11b 27/34

[58] Field of Search .............. 179/100.2 R, 100.2 Z; 235/103; 274/4 C, 4 E; 33/127; 242/191, 200, 204, 206, 57; 340/174.1 C; 318/467

[56] References Cited

UNITED STATES PATENTS

| | | | |
|---|---|---|---|
| 2,460,190 | 1/1949 | Petroff et al. | 33/127 |
| 2,540,299 | 2/1951 | Shoup et al. | 179/100.2 R |
| 3,608,846 | 9/1971 | Pieplow | 274/4 C |
| 3,609,844 | 10/1971 | Ichikawa | 179/100.2 Z |
| 3,635,423 | 1/1972 | Lennie | 274/4 E |

*Primary Examiner*—Bernard Konick
*Assistant Examiner*—Robert S. Tupper
*Attorney, Agent, or Firm*—Lawrence E. Laubscher

[57] ABSTRACT

A tape displacement indicator assembly for a tape machine, particularly a magnetic record tape machine, which comprises two index members movable along adjacent paths on a scale and each arranged to be manually movable to any indicating positions on the scale, one of the index members being coupled with the tape drive mechanism of the machine for displacement in accordance with displacement of tape on the machine, and means responsive to movement of the index members to a predetermined relative position to de-actuate the tape drive mechanism of the machine. Also disclosed is a magazine-type magnetic record tape machine with a tape magazine loading tray and mechanism for use with a tape magazine having a pinch wheel mounted in the magazine.

8 Claims, 6 Drawing Figures

TAPE MACHINE WITH INDEX MEMBERS TO CONTROL TAPE TRANSPORT

BACKGROUND OF THE INVENTION

This invention relates to a tape machine, that is to say to a machine which involves the movement of an elongate member such as, for example, a magnetic record tape or a motion picture film strip, and to a tape displacement indicator assembly in such a machine. The invention is particularly, but not exclusively, applicable to a magazine-type magnetic record tape machine.

In a known magnetic record tape machine, a tape displacement indicator is coupled with the drive mechanism for the tape so that an index member is moved along a scale in accordance with the movement of the tape, thereby to indicate displacement of the tape. In spool-to-spool type record tape machines such an indicator normally provides a satisfactory indication of the position and displacement of tape since in general the tape would be rewound onto one spool before being removed from or loaded into a machine. Thus the index member is normally positioned at zero both when a tape is removed from and when a tape is loaded into a machine, and therefore starts moving from the correct indicating position as a fresh tape is started to be used in the machine.

In the case of magazine-type machines, however, the tape can be at any position in the magazine when it is loaded into or removed from the machine, and the above described known indicator would not necessarily provide a correct indication of the position or displacement of the tape during subsequent movement of the tape.

In another known magazine-type record tape machine, a drive capstan and pinch wheel for the tape are mounted on the tape deck. When a magazine of tape is loaded in the machine, therefore, it is necessary to ensure that the tape passes between the drive capstan and pinch wheel. This means that the loading operation can be somewhat intricate, and the loading mechanism for the machine rather cumbersome and inconvenient to use.

It is an object of the present invention to overcome the above-described disadvantages of the prior art.

SUMMARY OF THE INVENTION

In one aspect the invention provides a tape position indicator in a tape machine, comprising an index which is movable by the mechanism of the machine to indicate displacement of the tape. The index can also be manually set to any desired indication position (including zero) and, when the tape then moves forwards or backwards, the index moves correspondingly forwards or backwards from the set position. In use, when recording on the tape a note is made of the position to which the index was set at the start of recording and of the position to which the index has been moved by the mechanism at the end of the recording. If the tape is then removed from the machine, note is made of the position of the index when the tape is removed; if the machine is of the magazine type, the magazine can simply be removed with the tape in the position it reached at the end of the recording; alternatively, if the machine has a rewind facility, the tape can be wound back to another position and, if the machine is of the cassette type, the tape is conveniently wound back until the index is at the original start position again. When the tape is subsequently played back on the same or a similar machine, the index is set to the position in which the tape was left previously and the indicator will then give a true indication of the subsequent movement of the tape.

The indicator is driven by the rotation of the tape spools and the displacement of the index is accordingly not proportional to the displacement of the tape. However, this does not affect the accuracy of the reading given on playback if the procedure described above is used.

The indicator is applicable to a variety of tape machines. Preferably, where the machine is of magazine type and particularly of cassette type, and is capable of rewinding the tape, a manually settable control is provided for stopping the rewinding tape at a desired position. Preferably this control comprises a second index which can be manually set to a position corresponding to the desired stop position. In the preferred embodiment, the first and second indexes are movable along adjacent parallel tracks beside a common scale member, and have co-operating electrical contacts which close an electrical path to produce an electrical signal when the two indexes are adjacent each other at corresponding positions on the scale. The signal controls a relay or other switch means to halt the tape rewind. In use, when the second index is set to the initial starting position of the tape and when the tape is rewound, either at the end of recording or just before playback, the tape can be halted at the start of the recording. This feature is particularly useful where the cassette is used for dictation; the dictation can be recorded on one machine, a note made at the beginning and end of the, or each, passage of dictation, and then played back on another machine for transcription, the tape being rewound to the start position of the relevant recording either on the recording machine or on the playback machine.

The automatic stop control is also useful in other circumstances. For example, in teaching languages, a lesson or other passage is recorded on the tape and a student may wish to return to the beginning of the passage which may not be at the beginning of the tape. This is facilitated by the automatic, manually settable, stop control.

The automatic stop control can also be used on machines of cartridge type, that is to say where the tape is in a coiled endless loop. Although rewind facilities are often not provided on such machines, the tape can be wound forwards and halted at the desired position automatically. The indicator, with or without the automatic stop control, is useful with tape machines other than magnetic tape record machines (having recording and/or playback facilities). The indicator is also useful to give indication of the movement of an elongate member, such as a band or strip; for example in a film strip projector or a motion picture film projector.

In the preferred embodiment, the scale comprises an elongate support, which may bear scale markings, and a clip for retaining a strip which can be marked to indicate the positions of the index. For example, the strip may be of material, such as paper, which may be marked by a pen or pencil. When the tape is transferred from one machine to another, the marked strip may be transferred with it. Preferably, the strip bears scale markings also, and an aperture for co-operating with a stud on the support to locate the strip along the scale. Alternatively, the support may be formed with returned flanges along its edges so that the strip can be inserted into the channel so formed and slid into position from one end.

In the preferred embodiment, the scale is straight to provide a rectilinear indicator. The indexes are sliding projecting outwards at respective sides of a support, which forms a face member. Under the support member is an elongate threaded screw member which is mounted for rotation about its longitudinal axis, and is coupled (for example by a belt and pulley drive) to be rotated by the tape drive mechanism. A drive block is mounted on the screw member, encircling the screw member, so that it can slide along the scale, and the drive block is mechanically connected to the first index, so that they move together. A drive spring mounted on a stud in the drive block engages the thread on the screw member. As the screw member rotates the drive spring is driven along the threads the movement being transmitted to the drive block through the spring, so that the screw member and block form a worm gear. However the index can be pushed manually along the scale, the drive spring riding over the threads as it moves along the screw.

The second index is not coupled to the screw member, but carries a leaf spring which projects adjacent the path of the block and makes a sliding ground contact through the support member which is electrically conductive. The drive spring projects so as to make electrical contact with the leaf spring when the two indexes are opposite each other. The electrical circuit is completed through the screw member, which is mounted in electrically insulating bearings, the drive block and indexes being electrically insulating, electrical connection to the screw member being made by a spring contact engaging a rotating bushing mounted on the screw member.

From another aspect the invention provides a tape machine which includes a tape magazine loading tray and mechanism for use with a tape magazine having a pinch wheel mounted in the magazine.

In a preferred arrangement, the magazine loading tray and mechanism are arranged so that when loading a magazine, the magazine is inserted in the loading tray from the rear of the machine with the pinch wheel towards the front of the machine, a drive capstan and recording/playback head being located on the machine in front of the loading tray.

The loading tray is mounted so as to be movable between first and second positions for insertion or removal of the magazine, and for operation of the machine, respectively.

Preferably, in the first position the rear of the tray is raised with respect to the front of the tray and the main body of the machine to facilitate insertion and removal of the magazine, and movement to the second position involves lowering the rear of the tray and sliding the tray forward into operating relationship with the drive capstan and recording/playback head.

The mechanism for supporting and controlling movement of the loading tray comprises a sliding pivot connection between the front of the tray and the main body of the machine, and a lever pivotally mounted on the main body of the machine with one end connected with the loading tray behind the sliding pivot connection. One end of a single bias spring is mechanically connected with the lever to bias the lever in a direction such as to urge the tray towards the first position; the other end of the spring being mechanically connected with a catch member. The catch member, also pivotally mounted on the main body of the machine, is adapted to catch and lock the lever in position under the action of the bias spring when the tray is moved to the second position, thereby to keep the tray in the second position during operation of the machine. A catch release member, manually operable to move the catch member against the action of the bias spring, is provided to release the first lever, thereby to allow the tray to return to the first position under the action of the bias spring.

DESCRIPTION OF THE PREFERRED EMBODIMENTS

Figure 1:
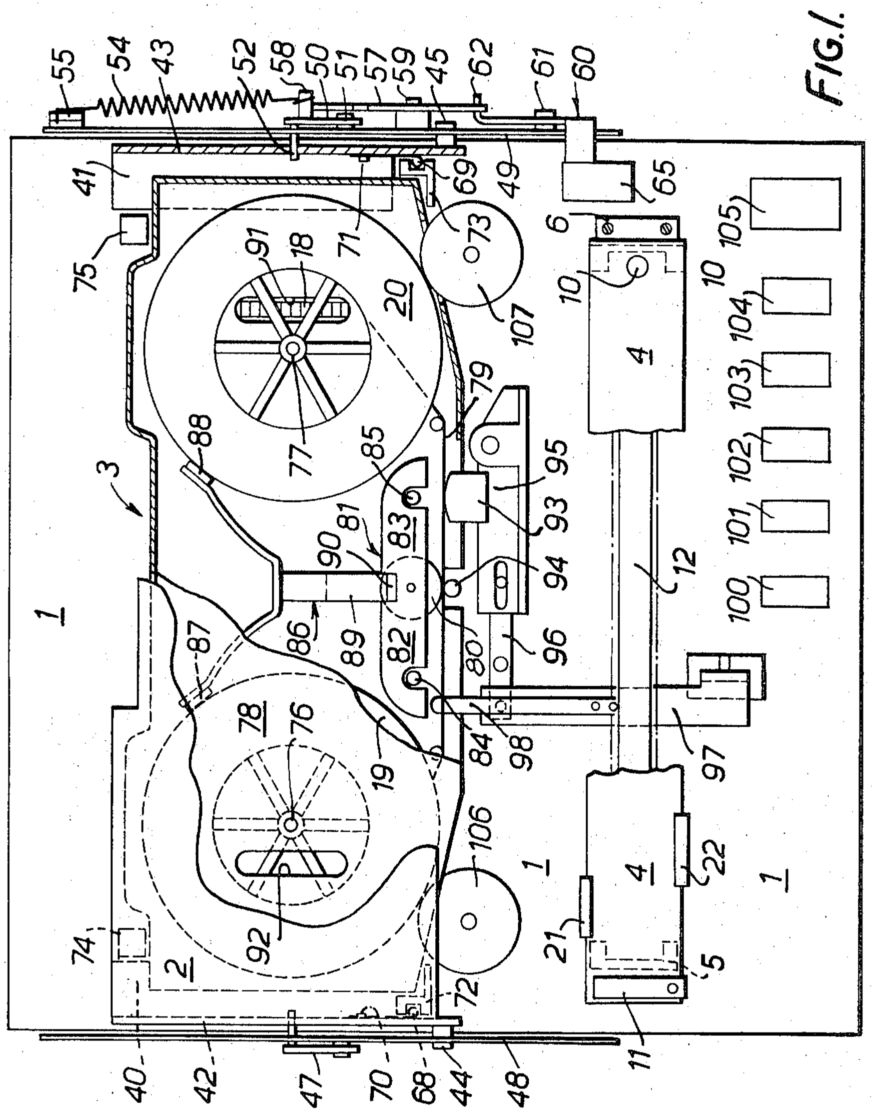
FIG. 1 is a part-sectional top view of a tape machine in accordance with the invention.

In the drawings FIG. 1 illustrates a part-sectional top view of the magnetic tape record machine of the preferred embodiment, parts of the top of the cassette loading tray, the upper cover of the cassette, and the scale support member being cut away to show more clearly the features of the embodiment. In the drawing the front of the machine is towards the bottom of the drawing and the rear of the machine is towards the top.

The embodiment comprises a substantially flat, horizontal, tape-deck 1 with the cassette loading tray 2 adapted to receive a tape cassette 3 supported over the rear part of the tape deck. A drive mechanism, amplifier means and associated parts are mounted below the tape deck and are not shown in the drawings.

The scale support member 4 for the tape position indicator is mounted across the front of the tape deck supported at either end by upstanding brackets 5, 6 attached to the tape-deck 1.

Figure 2:
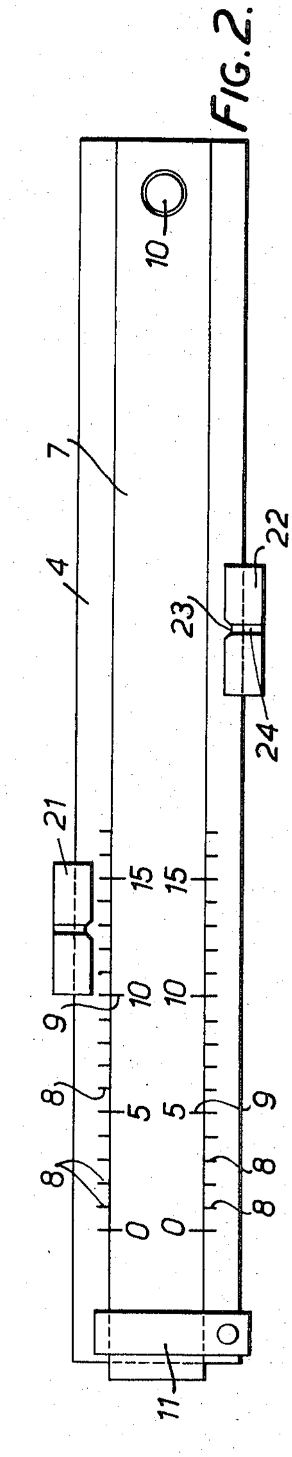
FIG. 2 is a top view of part of the tape position indicator of the machine illustrated in FIG. 1.

A detailed top view of the scale support member 4, having a strip 7 of, for example, paper mounted thereon is shown in FIG. 2. Preferably, scale markings 8 are provided on the scale support member, and in the illustration scale markings 9 are also shown on the strip 7. A strip location stud 10 projects from the top surface of the scale support member to receive a corresponding aperture in one end of the strip 7, and a clip 11 is attached to the other end of the support member to clamp the other end of the strip 7.

Figures 3, 4:
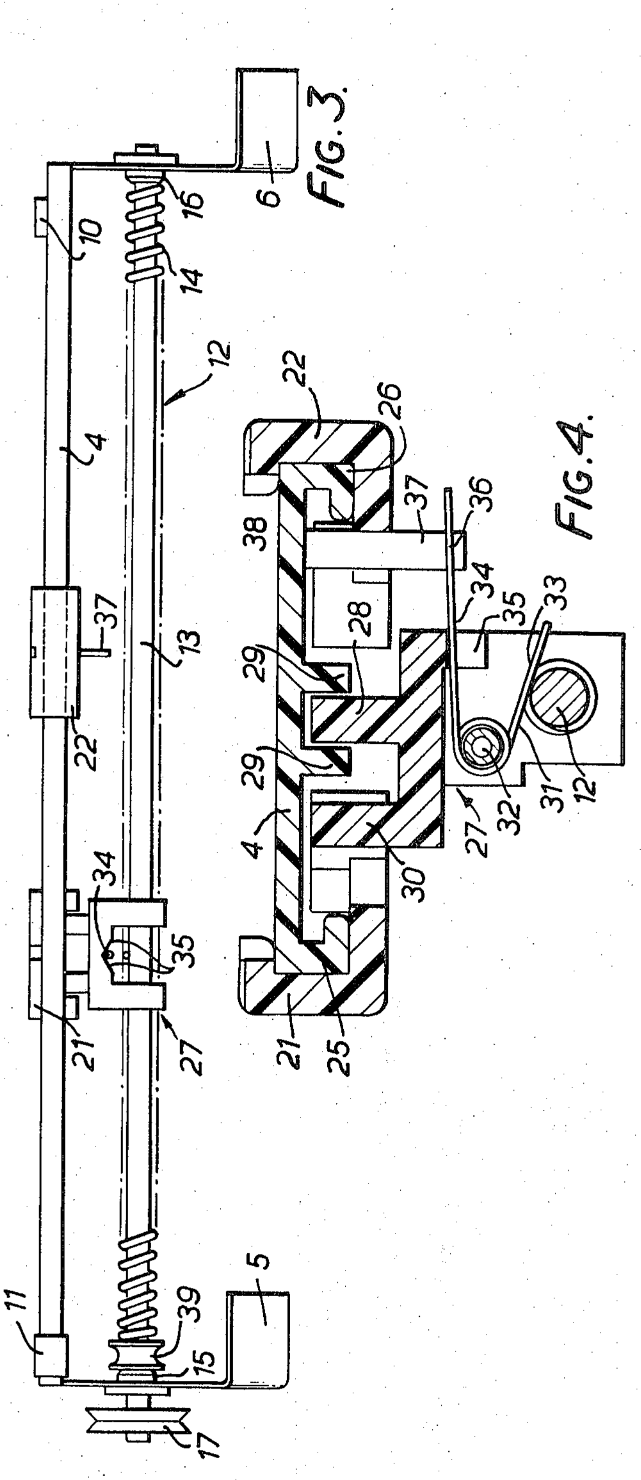
FIG. 3 is a front view of the part of the machine illustrated in FIG. 2.
FIG. 4 illustrates a vertical section through the part of the machine illustrated in FIG. 2.

The screw member 12 mounted below the scale support member is best seen in FIG. 3 which illustrates a front view of the scale support member and associated parts. The screw member 12 comprises a rotatable shaft 13 provided with a screw thread 14 along most of its length and supported at either end by bearings 15 and 16 received in the brackets 5 and 6. The bearings 15 and 16 are of electrically insulating material, preferably plastics material, to insulate the screw member from the brackets 5 and 6. The brackets 5 and 6 and tape-deck 1 are of metal. Conveniently, the screw thread 14 may be formed on the shaft 13 by fitting the shaft with a tight-fitting helical spring.

A drive pulley 17 is fast to one end of the screw member 12 and is coupled, by means of a belt and pulley system (not shown) to a nylon sprocket wheel 18 which is located for engagement with the spokes of one of the spools 19 and 20 (FIG. 1) of a cassette 3 loaded in the machine. Thus the screw member 12 is rotated by, and in accordance with, rotation of one of the spools of the cassette. These and other features of the tape position indicator drive system are described in further detail in the U.S. Pat. No. 3,680,812. However, unlike the system there described the nylon sprocket wheel is not resiliently mounted in the machine illustrated in FIG. 1.

The first and second indexes 21 and 22, slidingly mounted on the opposite sides of the scale support member 4, are preferably of plastics material. Reference grooves 23 and 24 are formed in the inner and top surface respectively of each index.

FIG. 4 shows a vertical cross section through the scale support member 4 and indexes 21 and 22 with the indexes positioned directly opposite one another on the scale support member. As may be seen from the figure, the indexes are formed so as to embrace turned flanges 25 and 26 formed on the sides of the scale support member 4, thereby to be retained on the scale support member.

The drive block 27, mounted on and embracing the screw member 12, is provided with a first upstanding flange portion 28 which is located between a pair of flange portions 29 formed on the underside of the support member 4 to guide the movement of the drive block along the scale. A second upstanding flange 30 engages with the first index 21 so that the index and drive block move along the scale together.

The drive spring 31 embraces the stud 32 mounted in the drive block. One end 33 of the spring 31 is urged into engagement with the thread on the screw member 12 and the other end 34 is located in a V-shaped groove 35 in the drive block 27 (as best seen in FIG. 3).

The extension 36 (FIG. 4) to the end 34 of the drive spring 31 provides the electrical contact between the drive spring 31 and the leaf spring 37 when the two indexes are opposite each other, and the upper end of the leaf spring 37 slidingly engages the underside of the scale support member at 38 to provide the sliding ground contact. The rotating bushing 39 mounted on the screw member for co-operation with a spring contact (not shown) engaged therewith to provide electrical connection to the screw member is shown in FIG. 3.

If one of the indexes is moved manually past the other index on the scale, the end 34 of the drive spring 31 is forced, by the leaf spring 37, to ride up a side of the V-shaped groove 35 until it is able to pass over the end of the leaf spring 37. Thus engagement of the end 34 of drive spring 31 and leaf spring 37 does not interfere with the manual movement of one index past the other along the scale.

As shown in FIG. 1, the cassette loading tray 2 comprises a rectangular box shaped member of synthetic plastic material with the bottom of the box cut away to leave two inwardly projecting flanges 40 and 41 extending along the lower edges of the sides 42 and 43 of the tray.

The sliding pivot connection between the front end of the tray and the main body of the machine comprises two studs 44 and 45 projecting from respective ones of the sides 42 and 43 of the tray near the front of the tray and received in respective elongate slots formed in side plates 48 and 49 attached to the sides of the tape deck. The one of the elongate slots formed in the side plate 49 is shown in FIGS. 5 and 6 at 46.

Figures 5, 6:
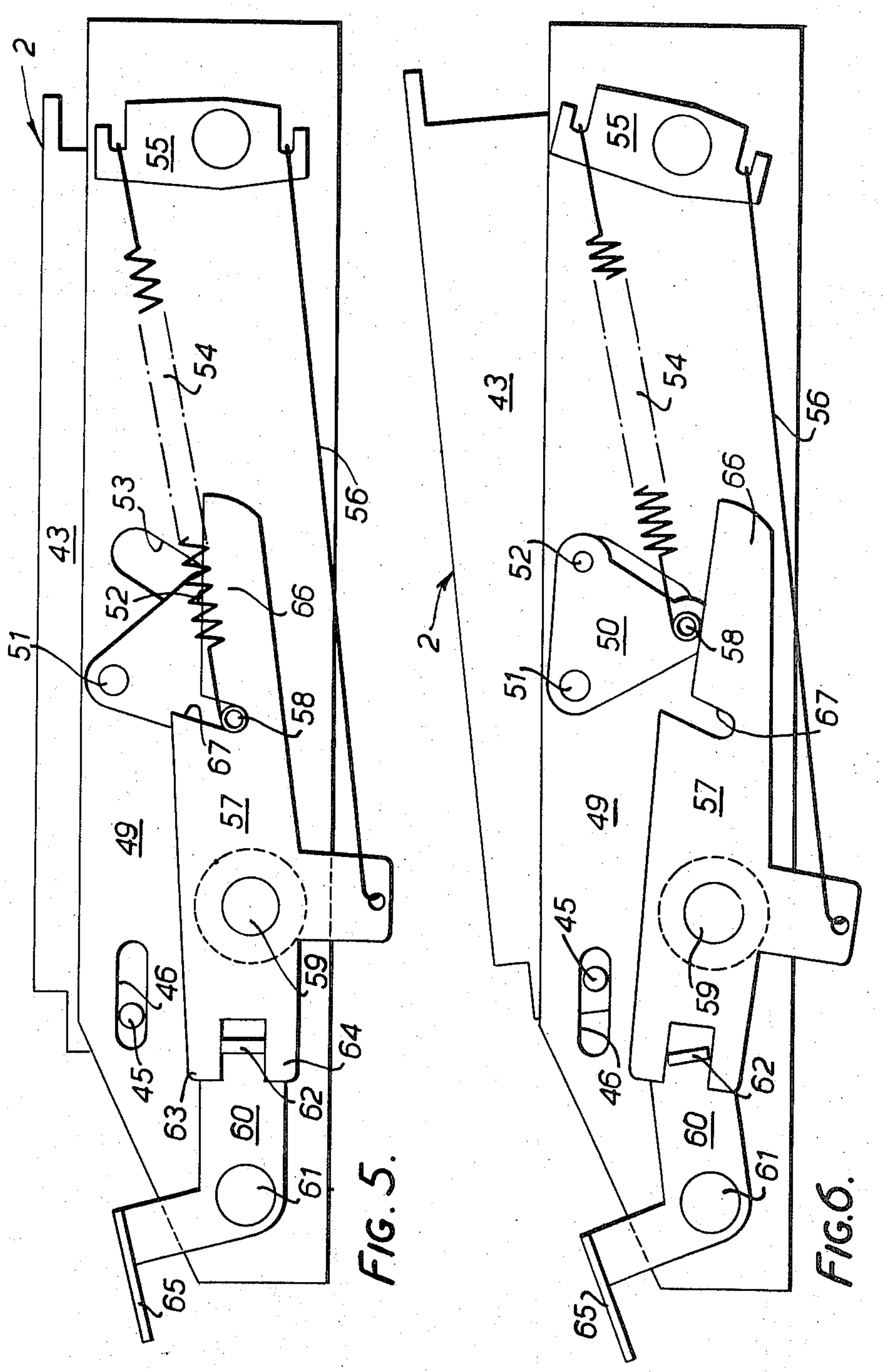
FIG. 5 is a side view of part of the machine illustrated in FIG. 1 showing the cassette loading tray mechanism with the cassette loading tray in the lowered position.
FIG. 6 is the same view of the part of the machine illustrated in FIG. 5 but with the cassette loading tray in the raised position.

Referring to FIGS. 5 and 6, the lever of the loading tray mechanism comprises a bell-crank member 50 pivotally mounted at 51 on the outer side of the side plate 49, one arm of the bell-crank member 50 being provided with a pin 52 extending through a clearance slot 53 in the side plate 49 and engaging rotatably in a hole in the side 43 of the loading tray 2. A similar bell-crank member 47 is mounted on the side plate 48 as shown in FIG. 1.

The single bias spring 54 of the loading tray mechanism is a tension spring connected to a pin 58 on the other arm of the bell-crank member 50 to bias the bell-crank member 50 in a counterclockwise direction about the pivot point 51 as seen in the figures.

The other end of the bias spring 54 is mechanically connected, by means of a second lever 55 and linkage member 56, with an arm on the catch member 57 so as to bias the catch member in an anticlockwise direction, as seen in the figures, about its pivot point 59.

The catch release member comprises a third lever 60 pivotally mounted at 61. One end of the lever 60 is formed with a lug 62 loosely engaged between arms 63 and 64 of the catch member, and the other end is formed with a finger pad 65 for manual operation.

As may be seen from FIG. 6, when the tray is in the first or raised position, a finger 66 on the catch member 57 abuts against the pin 58 on the bell-crank member 50, and the tray is retained in the raised position by the action of the bias spring 54 tending to rotate the bell-crank member 50 in the counterclockwise direction. As the tray is lowered, by being forced downwards and to the left as shown in the drawings, the pin 58 on the bell-crank member forces the finger 66 downwards to rotate the catch member in a clockwise direction about its pivot point, and at the same time moves to the left along the finger 66. Eventually, when the tray is fully depressed, the pin 58 reaches the slot 67 formed at the base of finger 66, and the finger snaps abruptly upwards to embrace the pin 58 in the slot 67. The mechanism is thus locked in the second position, the bell-crank member being unable to return in a counterclockwise direction under the action of the bias spring with the pin 58 engaged in the slot 67.

Release of the mechanism is effected by depressing the finger pad 65 manually so as to rotate the lever 60 in a counterclockwise direction, the catch member 57 thereby being rotated in a clockwise direction by the lug 62. The pin 58 of the bell-crank member 50 then disengages from the slot 67, and the bell-crank member 50 is able to rotate in a counterclockwise direction under the action of the bias spring 54 so as to raise the tray to the first or raised position.

On the inner surfaces of the sides 42, 43 of the loading tray 2, means are provided to bias a cassette rearwardly when it is loaded in the tray. As shown in FIG. 1 this means comprises coiled springs 68, 69, the outer ends of the coiled springs being anchored to the respective sides 42, 43 of the loading tray 2 at 70 and 71, and slide members 72, 73 connected with the inner ends of the respective coiled springs 68, 69 and movable forwardly along the sides 42, 43 so as to unwind the coiled springs.

To load a cassette in the machine when the loading tray is initially in the second position, the finger pad 65 is first depressed to allow the loading tray 2 to move to the first, raised, position. The cassette is then inserted, with the pinch wheel foremost, in the rear of the tray and, supported on the flanges 40, 41, is slid forwardly towards the front of the tray. During this forward movement of the cassette, the front corners of the cassette engage with the slide members 72, 73 and push the slide members forward against the action of the coiled springs 68, 69, slight finger pressure being necessary to push the cassette forward against the action of these springs.

When the cassette has been pushed fully forward into the tray 2, pressure is applied manually to the top of the tray to push the tray down into the second position against the action of the bias spring 54, the tray then being locked in this position by catch member 57 as described above.

When the tray is locked in the second position, the cassette is retained in position in the tray 2 against the action of the coiled springs 68, 69 by engagement with upstanding stop members 74, 75 formed on the surface of the tape-deck 1. To remove a cassette from the machine, the finger pad 65 is depressed to allow the tray 2 to move to the raised position under the action of the bias spring 54, whereupon the cassette disengages from the stop members 74 and 75 and moves rearwardly in the tray under the action of the coiled springs 68, 69 to a position in which it may readily be grasped and removed from the machine by hand.

FIG. 1 of the drawings shows a cassette 3 suitable for use with the machine illustrated, the cassette being loaded in the machine ready for operation. The cassette comprises two spools 19 and 20, rotatably mounted on spindles 76 and 77 supported in a housing 78. The tape 79 passes along a path between the spools 19 and 20, over a central pinch wheel 80.

The pinch wheel 80 is mounted in a spring loaded cage 81 having yoke arms 82 and 83. The yoke arms 82 and 83 normally engage stops formed by posts 84 and 85 and the cage 81 is spring biased into this position.

A brake member 86 is mounted between the spools 19 and 20 and spring biased in the forward direction so that felt brake pads 87 and 88 are normally pressed against the spools 19 and 20. The forward portion of the brake member 86 is formed with upper 89 and lower (not shown) legs which pass respectively above and beneath the cage 81 and terminate in respective upwardly 90 and downwardly extending lugs.

These and other features of a cassette suitable for use with the machine illustrated in the drawings are described in further detail in British patent specification No. 1,170,581. However, for use with the machine illustrated in the drawings, at least the spool 20 of the cassette 3 is spoked, and a slot 91 is provided in at least one side of the housing 78 of the cassette to allow the nylon sprocket wheel 18 of the tape position indicator drive system to engage with the spokes of the spool 20 as described in the above-mentioned U.S. Pat. No. 3,680,812. Preferably, the spool 19 is also spoked, and a second slot 92 is provided in the other side of the housing 78 so that the cassette may be loaded and used in the machine with either side of the housing uppermost, in a similar manner to that described for example in the above-mentioned British Pat. No. 1,170,581.

The recording/playback head 93 and drive capstan 94 are both located on the tape deck to the front of the cassette loading tray 2 so that when a cassette is loaded in the tray, the tape follows a path across the active surface of the recording/playback head 93 and between the drive capstan 94 and the pinch wheel 80 in the cassette.

When the cassette is loaded in the machine, the capstan 94 presses against the tape 79 to push the pinch wheel 80 rearwardly in the cassette so as to disengage the cage 81 from the posts 84 and 85. The spring bias on the cage 81 thereby provides positive driving engagement between the pinch wheel 80, tape 79 and drive capstan 94.

The record/playback head 93 is mounted on a pivotally movable lever 95 which is connected, by means comprising lever 96 and linkage member 97, with a control mechanism mounted beneath the tape deck 1. A movable finger 98 is also connected with the linkage member 97, and extends into the housing of the cassette with its rearmost end adjacent the front edge of the yoke arm 82 of the cage 81.

The control mechanism for the machine is operable by means of push button keys 100 to 105 mounted along the front of the machine, and is connected to control the drive mechanism, amplifier means and associated parts by means of mechanical linkages and switches mounted beneath the tape deck 1.

To operate the machine, one of the keys 100 to 104 is depressed manually to obtain the desired function. The keys 100 to 104 are operable to provide the playback record, forward wind, step back and rewind functions respectively. The key 105 is operable to stop the machine.

Each of the keys 100 to 105 are spring biased to the unoperated position, but the control mechanism is effective to lock any one of the keys 100, 101, 102 or 104 in the depressed position. The keys 103 and 105, however, return to the unoperated position when no finger pressure is applied to them. The control mechanism is so arranged that should one of the keys be depressed when another of the keys is already locked in the depressed position, the second key will be released and will return to the unoperated position under the action of its spring bias.

Spool drive wheels 106 and 107 are mounted on shafts extending through the tape deck 1 from the drive mechanism beneath, and are engageable with the spools 19 and 20 respectively of the cassette through respective openings formed in the cassette housing.

In operation, during the record and playback functions, the tape 79 is driven along its path between the spools 19 and 20 by rotation of the drive capstan 94, the take-up spool also being driven by an appropriate one of the spool drive wheels 106 and 107.

Upon depressing the forward wind, rewind or step-back keys 102, 104 and 103, however, the control mechanism is effective to displace the linkage member 97 is a rearward direction. This causes the lever 95 to pivot in a counterclockwise direction as seen in the drawings so as to withdraw the record/playback head from the tape 79. The rearward movement of the linkage member 97 also causes the finger 98 to engage the front edge of the yoke arm 82 so as to displace the cage 81, with the pinch wheel 80, in a clockwise pivotal movement about the post 85 against the action of the spring bias on the cage member 81.

Thus during the forward wind, rewind and step-back functions both the pinch wheel 80 and the record/playback head 93 are disengaged from the tape. During these functions the movement of the tape is effected solely by the rotation of the take-up spool being driven by the appropriate one of the spool drive wheels 106 and 107.

The control mechanism also comprises a mechanical linkage (not shown) including a brake release lug (not shown) projecting through the tape deck 1 for engagement with the downwardly extending lug on the lower leg of the brake member 86 of the cassette. Depression of any one of the operating keys 100 to 104 is effective to move the brake release lug rearwardly so as to engage the downwardly extending lug on the brake member 86 and to displace the brake member 86 rearwardly against its spring bias. The brake pads 87 and 88 are thereby disengaged from the spools 19 and 20 whenever one of the operating keys 100 to 104 is depressed, but engage the spools when the machine is not being operated or when the stop key 105 is depressed.

What is claimed is:

1. In a magnetic tape apparatus including a tape deck, and means for displacing a magnetic tape relative to said tape deck, the improvement which comprises a. first (21) and second (22) index members;

b. means mounting said index members with said tape deck for independent sliding movement along adjacent first and second paths, respectively, whereby each of said index members is adapted for manual setting to a selected indicating position along its path of travel;

c. drive means (12) for displacing said first index member along said first path as a function of displacement of the tape on said tape deck, whereby the instantaneous position of said first index member along said first path is a function of the displacement of the tape on the machine; and d. switch means (36, 37) responsive to movement of said index members to predetermined relative positions on said first and second paths, respectively, for deactivating said magnetic tape displacing means.

2. Apparatus as defined in claim 1, wherein said switch means comprises co-operating contacts mounted on said first and second index members, respectively, said contacts being arranged for engagement when said index members are positioned adjacent each other on said first and second paths, respectively.

3. Apparatus as defined in claim 1, wherein said tape displacing means includes means (104) operable to rewind said magnetic tape relative to said tape deck, said switch means being operable to de-activate said rewind means when said index members have predetermined positions relative to said tape deck.

4. Apparatus as defined in claim 1, and further including an elongate scale member (4), means (25, 26) associated with said scale member for guiding said index members along said first and second paths, respectively, a markable record (7), and means (10,11) supporting said record on said scale member adjacent said first and second index members, whereby the record may be marked to denote the positions of said index members on said paths, respectively.

5. Apparatus as defined in claim 4 wherein said drive means comprises a screw member (12) rotatably connected with said tape deck in generally parallel relation to said scale member, means (17) for driving said screw member by said tape displacing means, a drive block (27) slidably mounted on said drive block being mechanically connected with said first index member, and a drive spring (31) mounted on said drive block and resiliently engaging the thread on said screw member, whereby said drive spring is driven along the thread on said screw member on rotation thereof to displace said drive block and said first index member along said first path, and said drive spring rides over the thread on said screw member on manual displacement of said first index member and said drive block to selected indicating positions.

6. A magazine-type magnetic tape apparatus, comprising a. a tape deck (1);

b. a tape magazine loading tray (2) connected with said tape deck, said loading tray containing a rear opening for receiving a tape magazine having a pinch wheel mounted therein, said loading tray having also a front opening affording access to said tape magazine and to said pinch wheel;

c. means for displacing said tape relative to said tape deck, said tape displacing means including a tape drive capstan (94) and a record/playback head (93) connected with said tape deck adjacent the front opening of said loading tray for cooperation with said pinch roll and with said tape, respectively, whereby the tape is driven by the capstan relative to said record/playback head;

d. first (21) and second (22) index members;

e. means mounting said index members with said tape deck for independent sliding movement along adjacent first and second paths, respectively, whereby each of said index members is adapted for manual setting to a selected indicating position along its path of travel;

f. drive means (12) for displacing said first index member along said first path as a function of displacement of the tape on said tape deck, whereby the instantaneous position of said first index member along said first path is a function of the displacement of the tape on the machine; and g. switch means (36,37) responsive to movement of said index members to predetermined relative positions on said first and second paths, respectively, for deactivating said magnetic tape displacing means.

7. Apparatus as defined in claim 6, and further including means pivotally connecting said loading tray with said tape deck for movement between an operative position relative to said record/playback head and an inoperative loading and unloading position.

8. Apparatus as defined in claim 7, wherein said pivotal connecting means comprises sliding pivot means (45,46) arranged adjacent the forward end of said loading tray, thereby to permit pivotal raising of the rear of the tray relative to the front of the tray toward the loading and unloading position, said tray being movable toward said operative position by lowering the rear of said tray and sliding the tray forwardly toward said drive capstan and said record/playback head.

* * * * *